Figure 5:
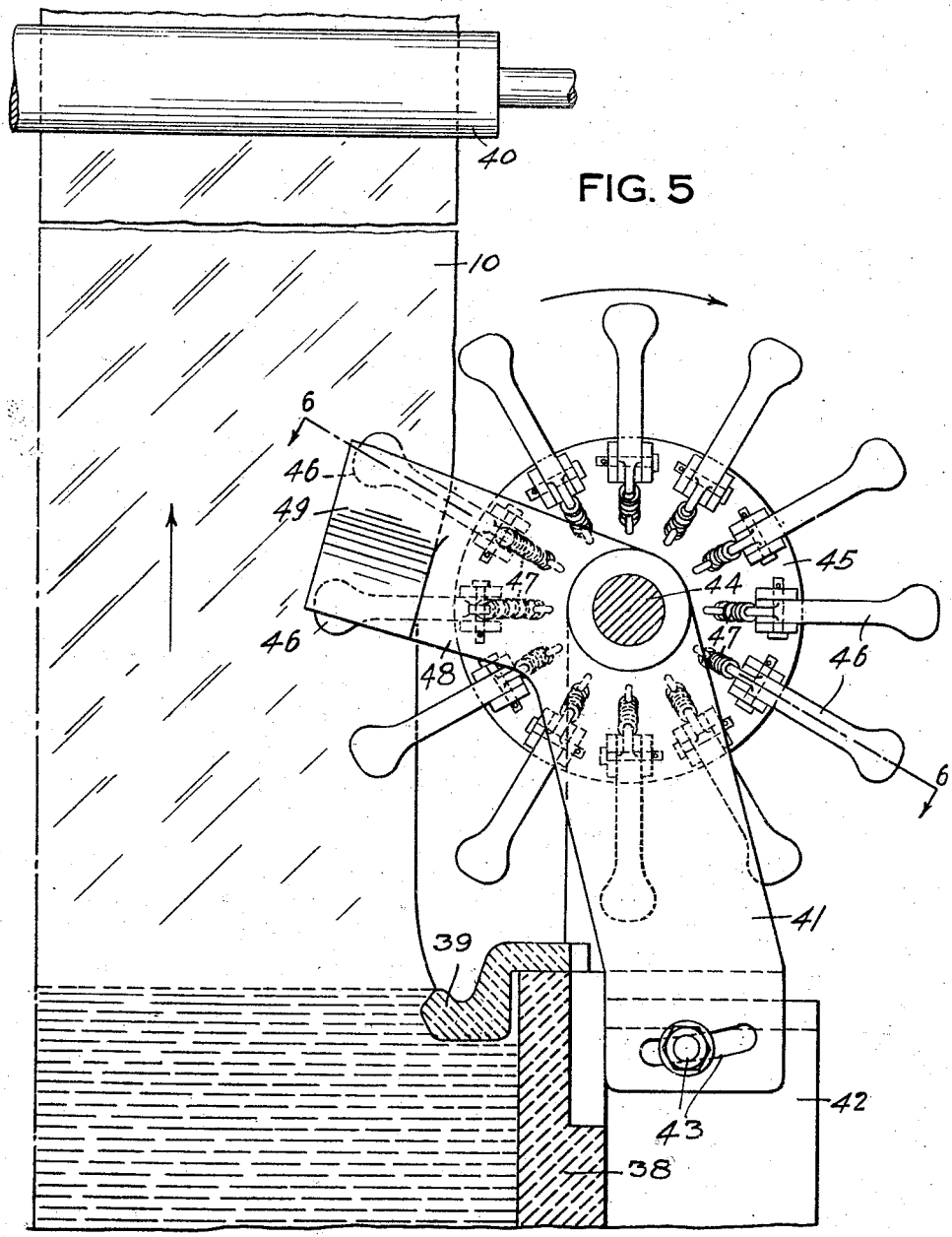

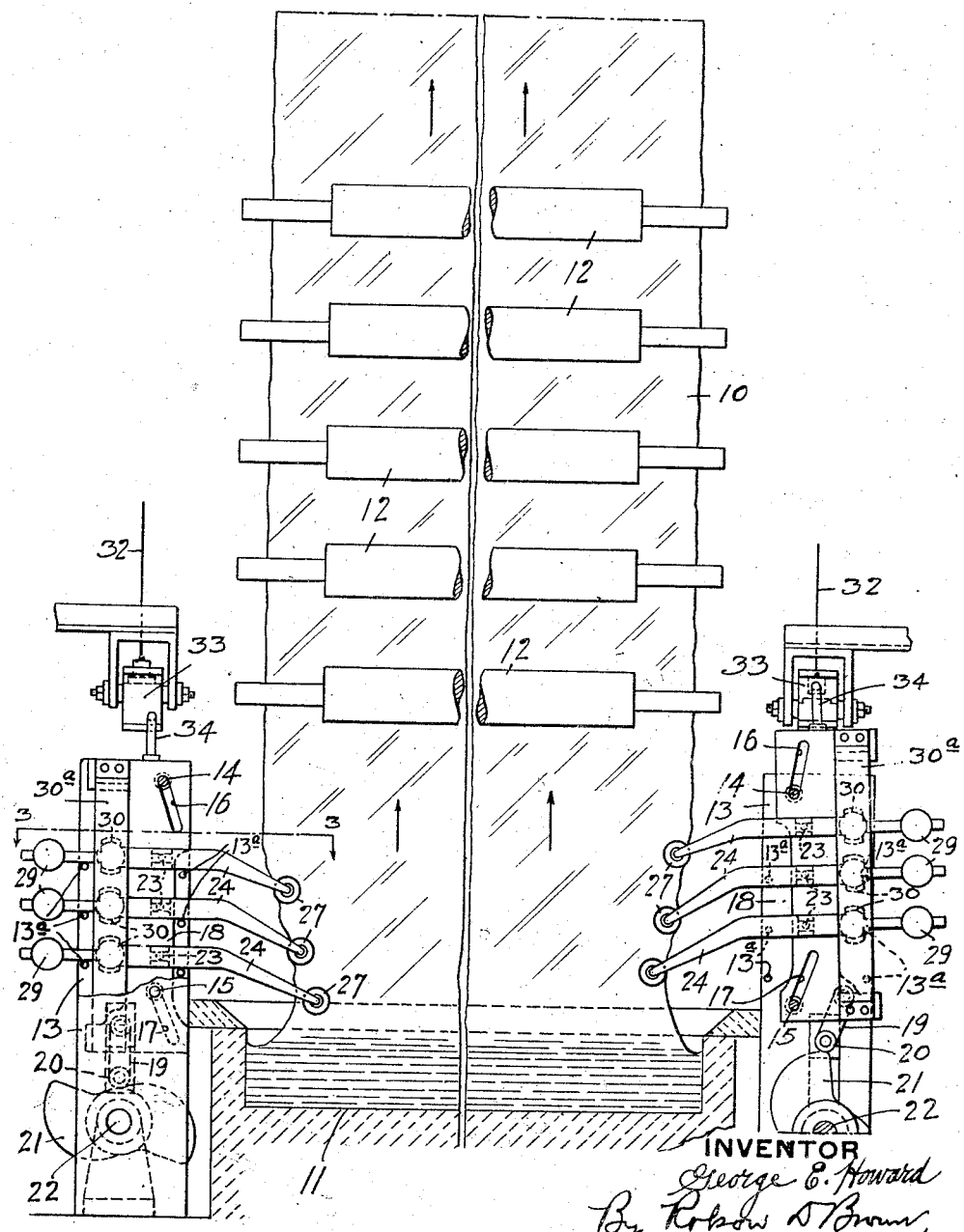

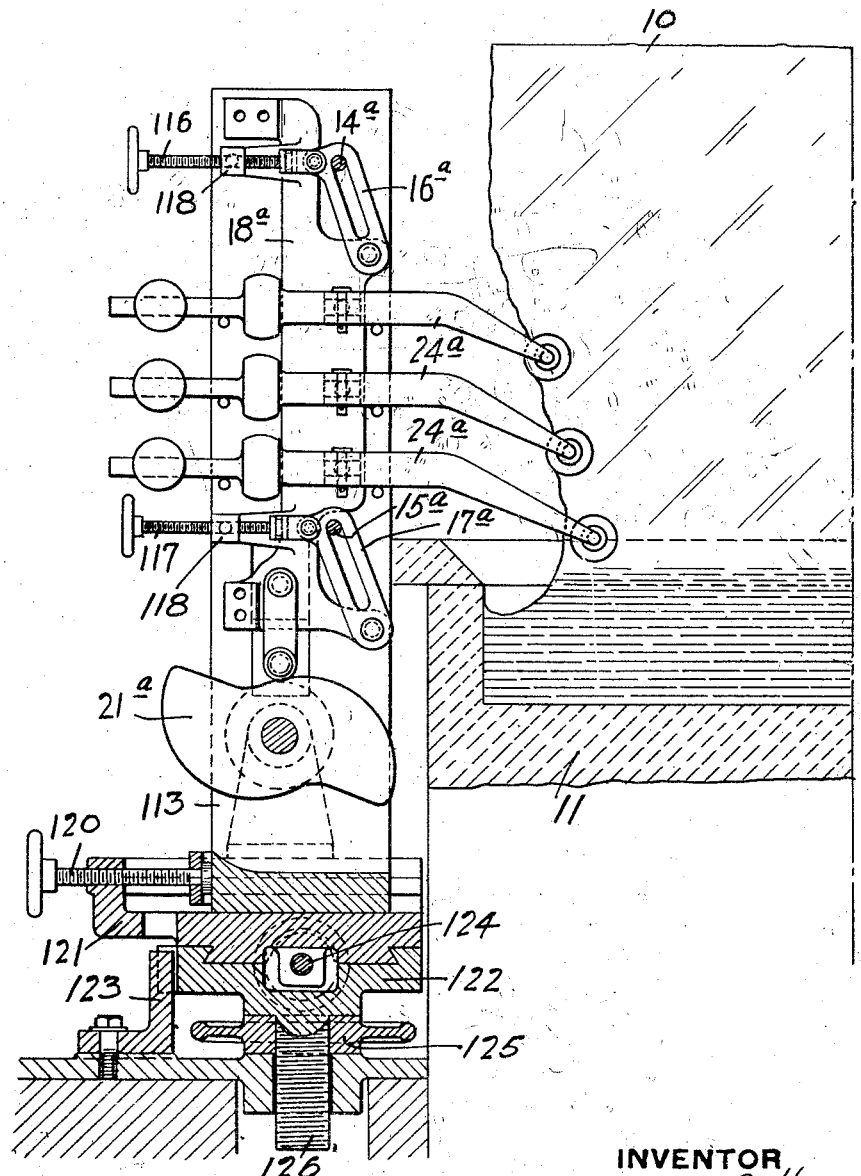

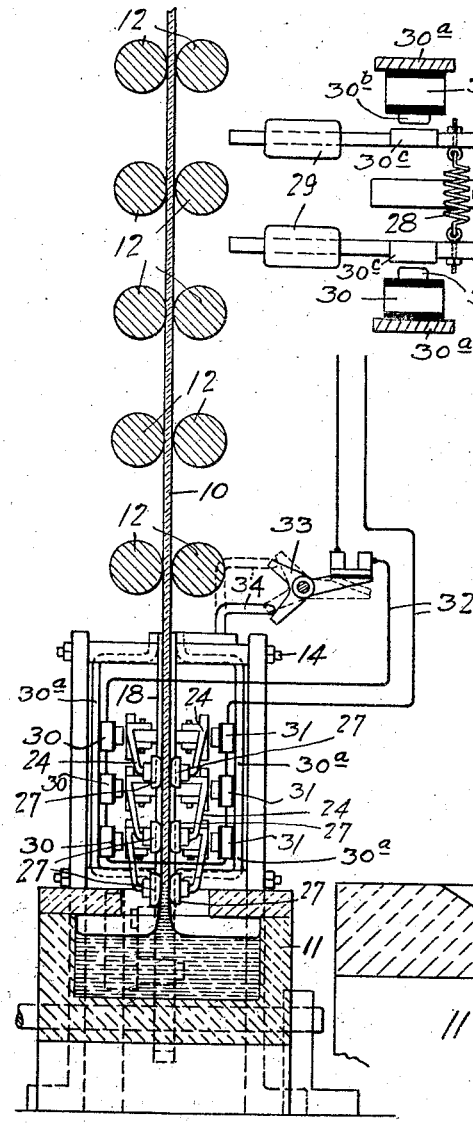
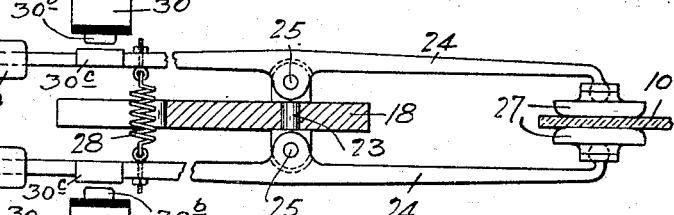
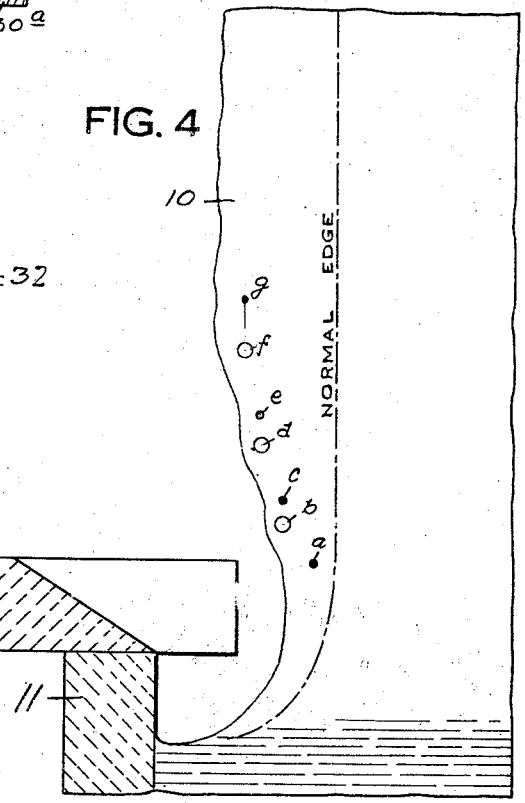

Feb. 1, 1927.
G. E. HOWARD
1,616,371
APPARATUS FOR FORMING SHEET GLASS
Filed April 13, 1926    5 Sheets-Sheet 4

INVENTOR
George E. Howard
By Robson D. Brown,
Attorney.

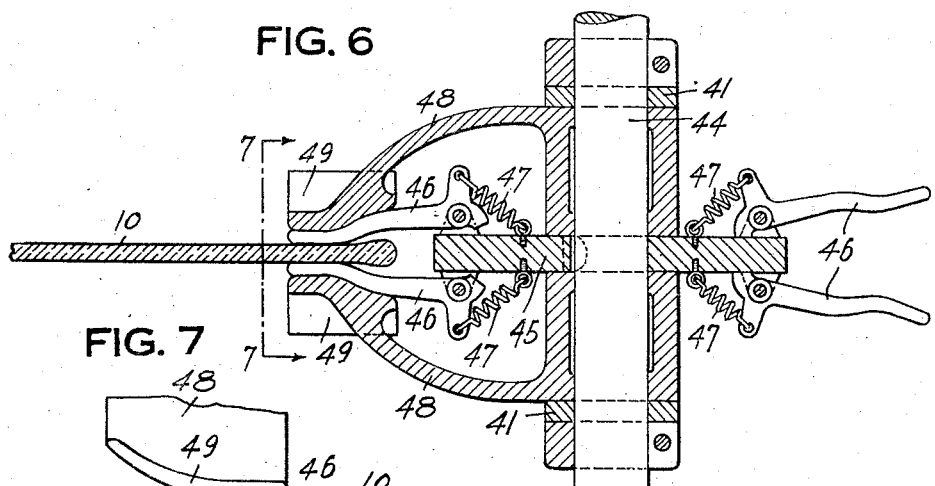
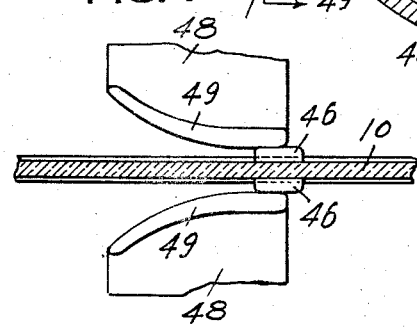
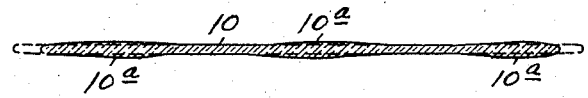
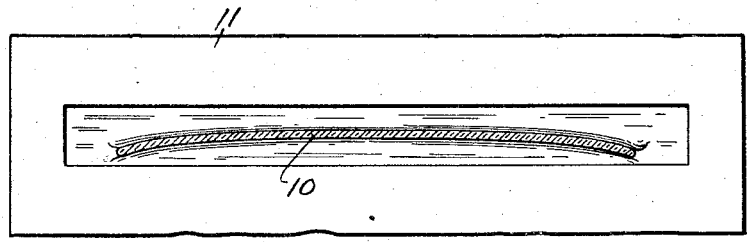

Patented Feb. 1, 1927.

1,616,371

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

APPARATUS FOR FORMING SHEET GLASS.

Application filed April 13, 1926. Serial No. 101,677.

My invention relates to an apparatus for forming sheet glass, and is particularly useful in connection with the formation of window glass by the continuous drawing process.

This invention is more especially intended for use in the drawing of window glass by the continuous method, which involves the drawing of a flat sheet directly from a batch of molten glass. One method which is followed in the forming of window glass comprises the drawing of a flat sheet from a forehearth with a drawing ring that has a relatively wide opening or drawing directly from the open bath in the forehearth. Sheets are also drawn through a slotted drawing ring of such narrow width that it serves to define the thickness of the sheet being drawn, and tends to keep the sheet straight.

In cases where the sheet is drawn direct from a bath or through a wide spout, the sheet tends to curve slightly in a transverse direction, which necessitates passing the same, while still plastic, over a flattening roll, which requires deflection of the sheet from a vertical plane and tends to cause cracking and wrinkling thereof, if the glass becomes too stiff, and marking by reason of contact with the roll, if the glass is too plastic.

Where the sheet is drawn through a narrow slot that controls the thickness of the glass, the bending operation may be dispensed with, but owing to the difficulty of maintaining a perfectly even flow through the slot it is extremely difficult to draw a sheet of uniform thickness.

One object of my invention is to provide a means and a method for stretching a sheet of glass laterally in order to flatten the same.

Another object of my invention is to provide means for more accurately controlling the lateral dimensions of a sheet of glass formed by the continuous process.

Still another object of my invention is to simplify and improve generally the methods and apparatus for forming sheet glass.

Some of the means by which my invention may be practiced are shown in the accompanying drawing, wherein Fig. 1 is a partially diagrammatic view, in elevation, showing means for drawing and stretching a sheet of glass; Fig. 1ª is a view showing means for effecting adjustment of the stretching mechanism of Fig. 1, relative to the glass bath; Fig. 2 is a vertical sectional view taken at right angles to the view of Fig. 1; Fig. 3 is an enlarged detail view of a portion of the apparatus of Figs. 1 and 2; Fig. 4 is a diagrammatic view showing the manner in which the stretching members act upon a sheet being drawn; Fig. 5 is a view, partially in elevation and partially in section, of a portion of sheet glass mechanism embodying my invention; Fig. 6 is a view taken on the line 6—6 of Fig. 5; Fig. 7 is a view taken on the line 7—7 of Fig. 6; Fig. 8 is a view showing in cross section the general appearance of an imperfect sheet of glass before being operated upon by my apparatus, and Fig. 9 is a similar view showing still another form which the sheet of glass may assume when emerging from a glass tank.

In the accompanying drawing, the sheet of glass 10 is represented as being drawn from a forehearth or glass tank extension 11 by means of rolls 12 that may be of conventional form and driven in any suitable manner. The lowermost of the rolls 12 are located at such distance above the glass bath that the glass has become set or hardened sufficiently previous to reaching such rolls that its surface will not be marred thereby.

In drawing the sheet of glass directly from a bath or through a wide-mouthed ring, the sheet will generally assume a curve or curves somewhat as indicated in Fig. 9, thus necessitating a flattening operation which, as above stated, has heretofore been commonly performed by bending the sheet over a flattening roll.

If the sheet is drawn through a narrow slot it tends to be of irregular cross section as shown in Fig. 8 at 10ª, owing to non-uniformity of temperature as between the various portions of the molten glass and the retardent effect of the walls of the slot, etc. In either case, it is necessary to the formation of a desirable product that the surface of the sheet be straight, or flat, and the sheet be of uniform thickness. In the accompanying drawing, I have shown means whereby these desirable results are obtained through a stretching action exerted by grippers which grasp the sheet adjacent to its edges and exert a lateral pull thereon.

Fixedly mounted base plates 13 are provided for supporting and guiding the grippers. Each of the plates is provided with pins 14 and 15 that extend into slots 16 and 17 that are formed in a slide 18. The slide 18 has pivotal engagement with the upper end of a link 19 whose lower end is provided with a roller 20 that is engaged by a cam 21. The cam 21 is mounted on a shaft 22 and driven from any suitable source of power and effects vertical reciprocation of the slides 18. By reason of the angular inclination of the slots 16 and 17, the slides 18 have angular movement in a vertical plane. That is, they move in angular directions relative to the path of travel of the sheet 10.

Each of the slides 18 supports three pivot pins 23 to which pairs of gripper arms 24 are pivotally connected by pins 25, so that the gripper arms have pivotal movement both in vertical and horizontal planes. Each of the arms 24 is provided at its outer end with a gripping pad 27 that has ball-and-socket connection with the arms, as shown in Fig. 3, so as to have universal movement. Tension springs 28 tend to normally maintain the outer ends of the arms in expanded position, and counterweights 29 balance gripper arms 24 so that they offer no resistance to the vertical travel of the sheet of glass. Magnets 30 and 31 are mounted on plates 30ª that are secured to the slides 18. These magnets are connected to an electrical transmission line 32, whose circuit is controlled by a switch 33. The switches 33 are operated by pins 34 that are mounted on the slides 18. The magnets 30 each have a core 30ᵇ and, when energized, attract a pad 30ᶜ on arm 24. This causes the gripper arms to move the pads 27 into engagement with the glass 10. The arms 24 when thus gripping the glass have movement about their pins 23, thus avoiding distortion of the glass through differences in rate of upward travel as between the glass and the slide.

When the slides 18 are in their lowermost positions as indicated at the left in Figs. 1 and 2, the switches 33 are in closed position and the magnets 30 and 31 energized to bring the gripper pads 27 into engagement with the glass as shown in Fig. 3. Movement of the cams 21 thereupon causes the slides to move vertically and laterally of the sheet of glass, thus stretching it. By reason of the fact that the slots 17 have greater inclination than the slots 16, the upper pairs of gripping pads effect a slightly less stretching action on the sheet than do the lower pair of pads, but have a faster vertical travel, since the sheet is cooler and thinner at higher points and travels faster, as well as requiring less stretching. The faster travel of the sheet at higher points is due to the fact that the glass is of much greater thickness at points near the molten bath and its movement is therefore slow, but as the mass becomes thinner and takes the form of a sheet its rate of vertical travel increases. In addition to stretching the sheet to flatten it, the lower pairs of grippers may serve to assist in maintaining the width of the sheet. Pins 13ª are provided on the base plates 13, in position to be engaged by the gripper arms when the slides 18 descend, to thereby bring the arms to horizontal position. In order that the lower arms 24 may clear the upper pins during elevation of the slide, the upper pins are successively shorter and the arms 24 correspondingly offset.

It will be understood that the travel of the sheet is constant so that it will be necessary to cause the grippers to periodically grasp the sheet. When the slides reach their uppermost positions the switches 33 are actuated by the pins 34 to break the circuit, thereby causing deenergization of the magnets and permitting the springs 28 to move the grippers out of engagement with the sheet. At this instant the high portions of the cams 21 pass from out of contact with the rollers 20, permitting the slides to fall. Falling movement of the slides brings the pins 34 again into engagement with the switches 33 to close the circuits and cause the magnets to force the grippers into engagement with the sheet of glass. At this time the cams 21 again start the slides on their upward movement.

Each pair of gripper arms is permitted to have movement independently of the other about its pivot 23 so that there will be no distortion of the edges of the sheet in a vertical direction, thus avoiding tendency to cause wrinkles transversely of the sheet, and the pads have universal movement on the gripper arms so that they will not distort the sheet when the arms swing about the pivots 23. The gripper arms 24 (Fig. 3) grasp the sheet of glass yieldingly and movement of the arms about their pivot 25 permits them to grasp sheets of varying thickness. The magnetic force exerted upon the pads 30ᶜ of arms 24 determines the frictional resistance to movement of the pads transversely of the sheet, and if the sheet has hardened and lost its plasticity the pads 27 will slip on the sheet, thus avoiding fracturing thereof if the lateral movement of the stretching mechanism continues after the sheet has hardened.

In Fig. 1ª, I have shown means for effecting adjustment of the stretching mechanism relative to the glass bath, in vertical and horizontal planes. Thus, if conditions render it desirable that the glass sheet be operated upon by the stretching mechanism at a higher point than that shown in the drawing, the stretching mechanism is elevated. Similarly the stretching mechanism may be shifted horizontally, in directions parallel to the plane of the sheet or at right angles thereto, in order to grip the sheet at the proper distance from its edges and to insure that the mechanism and the sheet will occupy a common plane. In this figure, I have also shown means for varying the angularity of movement of the stretching mechanism relative to the sheet, so that the degree of stretching may be varied to suit conditions.

In Fig. 1$^a$, the slide 18$^a$ which carries arms 24$^a$ is reciprocated vertically, on the base plate 113, by a cam 21$^a$. Slotted plates 16$^a$ and 17$^a$ are pivotally mounted upon the slide 18$^a$, in position to engage the pins 14$^a$ and 15$^a$ of the base plate. The plates 16$^a$ and 17$^a$ are adjusted about their pivots by screws 116 and 117 that have threaded engagement with swiveled nuts 118 that are carried by the slide 118$^a$. As the screws 116 and 117 are rotated, the angles of the slotted plates 16$^a$ and 17$^a$ are varied so that a greater or less degree of lateral stretching movement by the gripper arms 24$^a$ is secured if desired.

Lateral adjustment of the grippers, in the plane of the sheet, is effected by a screw 120 which has swivel connection with the base plate 113 and screw-threaded connection to a slide 121, so that as the screw is turned the base plate and the gripper arms carried thereby will be shifted toward or away from he edge of the sheet. The slide 121 has dovetail connection with a slide 122 that sets in a casting 123. A screw 124 has threaded engagement with the slides 122 and 123 and serves as a means for adjusting the base 113 in a direction transversely of the sheet of glass.

Vertical adjustment of the base plate and gripper arms is effected by a nut or hand wheel 125 that serves to raise and lower a threaded post 126 upon which the slide 122 is supported.

In Fig. 4 I have shown a portion of a sheet of glass in the act of being drawn and the process of formation, and indicating diagrammatically the action of the stretching devices thereon. If it be assumed that the three pairs of gripper arms at each edge of the sheet of glass engage the glass at the points $a$, $c$ and $e$. Upward and lateral movement of the gripper arms causes the glass gripped at the points $a$, $c$ and $e$ to be carried to the points $b$, $d$ and $f$, respectively. When the gripper arms release the glass at $b$, $d$ and $f$, the sheet will travel from the points $b$, $d$ and $f$ to the points $c$, $e$ and $g$, respectively, while the grippers are descending to again engage the sheet. The effect of the stretching action is indicated, to an exaggerated degree, by the fact that the sheet of glass would have only the width marked "normal edge" if only a conventional form of edge-maintaining device were employed, as compared to the increased width produced by my stretching devices. The stretching action is primarily designed to effect a straightening of the sheet, and in the case of a sheet of the form as shown in Figure 9 that is the sole purpose.

Where glass is drawn through a narrow slot and has a variable thickness as illustrated by Figure 8, then the lateral stretching tends to reduce the thickness at 10$^a$ and conform it to 10, as the thicker glass tends to be plastic after the thinner section has hardened, thus flattening the surface of the glass and equalizing its thickness.

Referring now to Figs. 5, 6 and 7, I show a portion of a tank or forehearth 38 and a drawing ring 39 through which the glass is drawn in the form of a sheet, by a pair of rollers 40 that may be driven from any suitable source of power (not shown) and engage the glass at a point where it has become set or hardened. The rollers 40 are preferably of asbestos or other suitable material which will not mar the surface of the glass.

At each side of the forehearth 38 I mount a bracket 41 (only one of which is shown) which is preferably adjustable upon its base 42 by means of a pin-and-slot connection 43, so that the bracket may be moved toward and away from the edge of the sheet of glass 10. A shaft 44 is rotatably mounted in the bracket 41 and driven in any suitable manner. A wheel or spider 45 is secured to each of the shafts 44. A plurality of pairs of gripping arms or clamps 46 are pivotally mounted upon each wheel 45, as indicated more clearly in Fig. 6, and are normally held in flared relation by means of tension springs 47. A guide block 48 is supported on each shaft 44 but does not rotate therewith. The guide block is provided with lips 49 that are flared at their ends so that as the wheel is rotated the arms 46 will be forced toward one another in order to grip the edge of the sheet of glass.

Since the arms 46 move through annular paths, it will be seen that if they are caused to grip the sheet 10 when entering between the lips 49 of the guide block, when such block is positioned at the point indicated in Fig. 1, the sheet will be drawn laterally at each of its edges, thus stretching it and causing the thickened portions 10$^a$ (Fig. 8) to be reduced. The reduction in thickness will occur at the thicker portions because such portions are hotter than the thinner intermediate portions, and will therefore be the first to yield under the pulling action. Similarly, if the sheet is bowed in cross section, as indicated in Fig. 9, the stretching force will exert a flattening action thereon and the sheet will be straightened to a plane.

While the forms of apparatus described above may have a tendency to prevent drawing in of the edges of the sheet, such is not their primary purpose. Furthermore, the stretching elements are located at such distance above the bath of glass that the sheet has had time to become set to a degree that it will remain in the flattened form to which it is brought by such elements.

Another object secured by this invention resides in the fact that the sheet of glass is straightened while in a vertical plane, thus rendering it unnecessary to deflect the same and pass it over flattening rollers or tables, since when the sheet passes the drawing rollers 40 it has hardened sufficiently to be ready for placing in a leer.

I claim as my invention:

1. Apparatus for forming sheet glass, which comprises means for drawing a sheet of glass from a molten bath, and means for engaging said sheet adjacent to its edges, comprising pairs of gripper arms which are movable laterally of the sheet, and which have movement independently of one another.

2. Apparatus for forming sheet glass, which comprises means for advancing a sheet of glass while in a viscous condition, a member reciprocable in a path divergent from the edge of said sheet, and a plurality of pairs of independently movable gripper arms pivotally mounted on said member.

3. Apparatus for forming sheet glass, which comprises means for advancing a sheet of glass while in a viscous condition, a member reciprocable in a path divergent from the edge of said sheet, and a plurality of pairs of independently movable gripper arms mounted on said member, the gripper arms having pivotal movement in a plane parallel to the plane of the sheet.

4. Apparatus for forming sheet glass, which comprises means for advancing a sheet of glass while in a viscous condition, a member reciprocable in a path divergent from the edge of the sheet, and a plurality of pairs of gripper arms mounted on said member, the said pairs of arms having independent movement with respect to one another.

5. Apparatus for forming sheet glass, which comprises means for advancing a sheet of glass while in a viscous condition, a member reciprocable in a path divergent from the edge of the sheet, and a plurality of pairs of gripper arms mounted on said member, the said pairs of arms having independent movement with respect to one another and pivotal movement relative to said member.

6. Apparatus for forming sheet glass, which comprises means for drawing glass from a molten bath, a sheet stretching member interposed between the said means and said bath, means permitting movement of said stretching member in the same general direction as the movement of the sheet, and means for effecting movement of said member in a direction transversely of the sheet and at a different rate of lateral travel at one vertical position thereof than at another vertical position, the last named means having provision for adjustment in a direction parallel to the path of travel of the sheet.

7. Apparatus for forming sheet glass, comprising means for advancing a sheet while in a viscous condition, and means for intermittently grasping said sheet at a given point, while advancing, and exerting a lateral stretching force thereon.

8. Apparatus for forming sheet glass, comprising means for advancing a sheet while in a viscous condition, means for grasping said sheet at a given point and exerting lateral stretching force thereon, and additional means for thereafter grasping the sheet at said point and exerting further lateral stretching force thereon.

9. Apparatus for forming sheet glass, which comprises means for drawing glass from a molten bath, a sheet stretching member interposed between the said means and said bath, means permitting movement of said stretching member in the same general direction as the movement of the sheet, and means for effecting movement of said member in a direction transversely of the sheet and at a different rate of lateral travel at one vertical position thereof than at another vertical position.

10. Apparatus for forming sheet glass, comprising means for drawing a glass sheet from a molten bath, sheet stretching tongs interposed between said drawing means and said bath, a member pivotally supporting said tongs, means for opening and closing said tongs, and means operating in predetermined relation thereto, for moving said member in the general direction of draw.

11. Sheet-drawing apparatus, comprising gripping tongs, a supporting member therefor, means for opening and closing said tongs, and means operating in predetermined relation thereto, for moving said member in the general direction of draw.

12. Sheet-drawing apparatus, comprising gripping tongs, a supporting member therefor, means for opening and closing said tongs, and means operating in predetermined relation thereto, for moving said member in the general direction of draw, but at an angle thereto.

13. Apparatus for forming sheet glass, comprising means for drawing a glass sheet from a molten bath, sheet-stretching means interposed between said drawing means and said bath, a member pivotally supporting said sheet-stretching means for movement about an axis that is perpendicular to the plane of the sheet, means for moving said member in the same general direction as the sheet, and means for causing said member to move at an angle to said direction.

14. Apparatus for forming sheet glass, comprising means for drawing a glass sheet from a molten bath, sheet-stretching means interposed between said drawing means and said bath, a member pivotally supporting said sheet stretching means, means for moving said member in the same general direction as the sheet, and means for causing said member to move at an angle to said direction.

Signed at Rochester, Minnesota, this 24th day of March, 1926.

GEORGE E. HOWARD.